US009845608B2

(12) United States Patent
Mewett et al.

(10) Patent No.: US 9,845,608 B2
(45) Date of Patent: Dec. 19, 2017

(54) VALVE

(71) Applicant: MP Hydro Pty Limited, Cooks Hill (AU)

(72) Inventors: Scott James Mewett, Cooks Hill (AU); Anthony Mark Cross, Cooks Hill (AU); Charles Eric Rickard, Cooks Hill (AU)

(73) Assignee: MP HYDRO PTY LIMITED, Cooks Hill, NSW (AU)

( * ) Notice: Subject to any disclaimer, the term of this patent is extended or adjusted under 35 U.S.C. 154(b) by 189 days.

(21) Appl. No.: 14/466,023

(22) Filed: Aug. 22, 2014

(65) Prior Publication Data
US 2015/0052674 A1 Feb. 26, 2015

(30) Foreign Application Priority Data

Aug. 22, 2013 (AU) ................. 2013903185
May 28, 2014 (AU) ................. 2014902023

(51) Int. Cl.
*E04H 4/14* (2006.01)
*F16K 15/02* (2006.01)

(52) U.S. Cl.
CPC ............. *E04H 4/14* (2013.01); *F16K 15/023* (2013.01); *Y10T 137/7837* (2015.04)

(58) Field of Classification Search
CPC ......... E04H 4/14; F16K 15/023; F16K 15/02; F16K 15/021
USPC ................. 137/511, 533.17, 533.21
See application file for complete search history.

(56) References Cited

U.S. PATENT DOCUMENTS

| 3,829,910 | A | 8/1974 | Kaufman |
| 4,276,163 | A | 6/1981 | Gordon |
| 5,036,881 | A | 8/1991 | Southmayd |
| 5,485,707 | A | 1/1996 | Wilkes |
| 2011/0011464 | A1* | 1/2011 | Lauber ............... F16K 17/12 137/171 |

OTHER PUBLICATIONS

Search Report for EP14180951 dated Jun. 15, 2015.
Examination Report for New Zealand Application No. 627191 dated Jul. 2, 2014.
Examination Report for New Zealand Application No. 626154 dated Jul. 22, 2014.

* cited by examiner

*Primary Examiner* — Janie Loeppke
(74) *Attorney, Agent, or Firm* — Andrus Intellectual Property Law, LLP

(57) ABSTRACT

A valve 10, for relieving ground water pressure on a swimming pool for containing pool water. A body 30 defines a flow path. An element 20 is mounted to be moved in a direction from a position, in which at least one feature 22 of the element co-operates with at least one feature 33 of the body to form a sealing arrangement to block the flow path to retain the pool water, to a position in which the flow path is open to allow ground water into the swimming pool. The sealing arrangement defines an effective area over which the ground water pressure acts to drive the element in the direction, and an effective area over which pool water pressure acts to drive the element opposite the direction. The co-operable features are configured such that a ratio, of the effective area over which the ground water pressure acts to the effective area over which pool water pressure acts, has a value of at least 0.9.

24 Claims, 5 Drawing Sheets

SECTION C-C

VALVE

CROSS-REFERENCE TO RELATED APPLICATIONS

The present application claims priority of Australian Patent Application No. 2013903185, filed Aug. 22, 2013, and Australian Patent Application No. 2014902023, filed May 28, 2014, the contents of which are incorporated herein by reference in their entireties.

FIELD

This invention relates to valves for relieving ground water pressure on swimming pools.

"Swimming pool" and similar terms as used herein take in spa baths and like structures for containing water in which a person may bathe.

BACKGROUND

A typical swimming pool is an upwardly-open cup-like structure for containing pool water. The pressure of the contained water tends to downwardly and outwardly drive the pool. On the other hand, in the case of in-ground pools, ground water pressure acts on the pool tending to drive it inwardly and upwardly.

Rising ground water is problematic for in-ground pools. When the ground water pressure exceeds the pool water pressure, the pool can bulge and/or crack and/or float out of the ground in the manner of a boat. Bulging and/or cracking are the more common failure modes in fibreglass pools whereas floating is the more common failure mode in concrete pools.

Swimming pools now incorporate pressure relief valves with the intent of addressing these problems. These valves are also known as hydrostatic relief valves.

Certain fibreglass pools incorporate a hydrostatic relief valve incorporating a vertically oriented cylindrical tubular body having a diameter of about 50 mm. The body includes a lower externally-threaded portion by which the body is threadingly engaged with the pool floor.

The cylindrical body is capped by a concentrically-mounted horizontal disc, mounted to move vertically. The disc is constrained by a spring mounting which downwardly drives the disc to compress an O-ring seal between the disc and the cylindrical body. Thus a sealing arrangement is formed so as to block the vertical flow path through the centre of the cylindrical body.

This sealing arrangement serves to prevent the pool water escaping from the pool via the valve. When the ground water pressure sufficiently exceeds the pool water pressure, the ground water acting on the disc upwardly drives the disc against its spring mounting. The disc is lifted about 10 mm from the cylindrical body to define a cylindrical gap through which the ground water may flow radially outwards into the pool.

Some concrete swimming pools incorporate a hydrostatic relief valve in the form of a "grease plate". A grease plate is an arrangement including a circular aperture formed in the floor of the pool. This aperture has a diameter in the vicinity of 160 mm and an upwardly-diverging conical wall. A thin-walled dinner plate-like disc fits within the aperture and has a conical rim complementary to the conical wall of the aperture. The top of the disc is typically filled with concrete (and tile, etc) to match the finish of the pool floor. The complementary conical surfaces are coated in grease so that they may co-operate to form an effective seal.

Despite the use of such valves, pools continue to fail. The present inventors have recognised that such failures may be attributed to existing relief valves:

1 allowing ground water pressure to build to destructive levels before the valve opens; and/or
2. providing inadequate pressure relief even when opened.

Australian Standard AS/NZS 1839:1994 suggests that pressure relief valves should "operate to relieve external water pressure so that the maximum pressure differential across the valve cannot exceed 30 mm of water". The inventors' own investigations have shown that various existing valves do not even open at this pressure differential.

The inventors have also recognised that existing valves leak and so sometimes require a diver to enter the pool to service the valve. Indeed diving is typically required whenever a grease plate is actuated.

Accordingly the invention aims to provide an improved valve for relieving ground water pressure on a swimming pool, or at least to provide an alternative valve in the marketplace.

It is not admitted that any of the information in this patent specification is common general knowledge, or that the person skilled in the art could be reasonably expected to ascertain or understand it, regard it as relevant or combine it in any way at the priority date.

SUMMARY

In a first aspect, there is provided a valve, for relieving ground water pressure on a swimming pool for containing pool water, including
a body defining a flow path; and
an element mounted to be moved in a direction
  from a position in which at least one feature of the element co-operates with at least one feature of the body to form a sealing arrangement to block the flow path to retain the pool water;
  to a position in which the flow path is open to allow ground water into the swimming pool;
the sealing arrangement defining
  an effective area over which the ground water pressure acts to drive the element in the direction; and
  an effective area over which pool water pressure acts to drive the element opposite the direction;
the co-operable features being configured such that a ratio
  of the effective area over which the ground water pressure acts
  to the effective area over which pool water pressure acts
has a value of at least 0.9.

The body is preferably mountable at a point of the pool. Alternatively it may be an integral part of the pool. Preferably it is at a low point of the pool.

Preferably the co-operable features are configured such that the ratio has a value of at least 0.95. Most preferably the co-operable features are configured such that the ratio has a value of more than 0.97.

Optionally the co-operable features include
  a resilient portion of one of the element and the body; and
  a projection of the other of the element and the body;
the resilient portion and the projection each encircle the flow path; and
in transverse cross-section the projection defines a tip for pressing into the resilient portion.

Preferably in transverse cross-section the projection is in substance V-shaped at least at the tip.

The resilient portion may be a ring carried in an annular groove, and is preferably a resilient portion of the body.

The valve may include a constraint by which the element is constrained, relative to the body, so as to automatically move, when pressure relief is no longer required, from its position in which the flow path is open to its position in which the flow path is blocked.

The valve is preferably configured to when open allow ground water into the pool via the flow path at at least a rate over at least some of a range of ground water pressures up to and including a pressure differential above the pool water pressure; wherein
the rate is at least 150 L/min; and
the pressure differential is at most 150 mm (water).

Another aspect of the invention provides a valve, for relieving ground water pressure on a swimming pool for containing pool water, including
a body defining a flow path;
an element mounted to be moved in a direction
from a position in which the element blocks the flow path
to retain the pool water;
to a position in which the flow path is open to allow
ground water into the ii ming pool; and
a constraint by which the element is constrained, relative to the body, so as to automatically move, when pressure relief is no longer required, from its position in which the flow path is open to its position in which the flow path is blocked; wherein the valve is configured to when open allow ground water into the pool via the flow path at at least a rate over at least some of a range of ground water pressures up to and including a pressure differential above the pool water pressure;
the rate is at least 150 L/min; and
the pressure differential is at most 150 (water).

The rate is preferably 300 L/min, or more preferably 450 L/min.

The pressure differential is preferably 75 mm, or more preferably 30 mm.

The valve is preferably configured such that:
when the element is in its position in which the flow path is open, the element and the body together define a gap through which the ground water flows into the pool;
the gap has a cross-sectional area; and
the cross-sectional area, of the gap, at its smallest point is at least 3000 $mm^2$, or more preferably at least 8000 $mm^2$.

Preferably the flow path has a cross-sectional area; and the cross-sectional area, of the flow path, at its smallest point is at least 5,000 $mm^2$, or more preferably at least about 10,000 $mm^2$.

Optionally the flow path is spanned by a filter for filtering debris from the incoming ground water. Preferably the filter spans a portion of the flow path having a cross-sectional area of at least about 10,000 $mm^2$.

The constraint may include a threaded piece rotatable relative to the element.

Another aspect of the invention provides a valve, for relieving ground water pressure on a swimming pool for containing pool water, including
a body defining a flow path;
an element mounted to be moved in a direction
from a position in which the element blocks the flow path
to retain the pool water,
to a position in which the flow path is open to allow
ground water into the swimming pool; and
a constraint by which the element is constrained, relative to the body, so as to automatically move, when pressure relief is no longer required, from its position in which the flow path is open to its position in which the flow path is blocked; wherein the constraint includes a threaded piece rotatable relative to the element.

The threaded piece is preferably threadingly engaged with the element, and most preferably defines a stop that limits movement of the element to define the position in which the element blocks the flow path. The threaded piece may be rotatable to drive the element away from the position in which the element blocks the flow path.

The valve preferably includes a jacking arrangement for driving the element away from the position in which the element blocks the flow path.

Another aspect of the invention provides a valve, for relieving ground water pressure on a swimming pool for containing pool water, including
a body defining a flow path;
an element mounted to be moved in a direction
from a position in which the element blocks the flow path
to retain the pool water,
to a position in which the flow path is open to allow
ground water into the swimming pool; and
a jacking arrangement for driving the element away from the position in which the element blocks the flow path.

The jacking arrangement preferably includes a threaded piece rotatable relative to the element to so drive the element, which piece is preferably threadingly engaged with the element and most preferably defines a stop that abuts the body when so driving the element.

The valve may include a mechanism for informing a pool attendant that the element is and/or has been in its position in which the flow path is open, which mechanism may incorporate a sensor for sensing the position of the element.

Preferably the valve includes a sensor for producing an output, the output being interpretable external to the pool and indicative of the element being, and/or having been, in its position in which the flow path is open.

Another aspect of the invention provides a valve operable to relieve ground water pressure on a swimming pool and including a mechanism for informing a pool attendant that the valve is and/or has been open.

Another aspect of the invention provides a valve openable to relieve ground water pressure on a swimming pool and including a sensor for producing an output, the output being interpretable external to the pool and indicative of the valve being, and/or having been, open.

Another aspect of the invention provides a swimming pool including a valve.

BRIEF DESCRIPTION OF DRAWINGS

An embodiment of the apparatus will now be described by way of example only with reference to the accompanying drawings in which.

DESCRIPTION OF EMBODIMENTS

Figure 1:
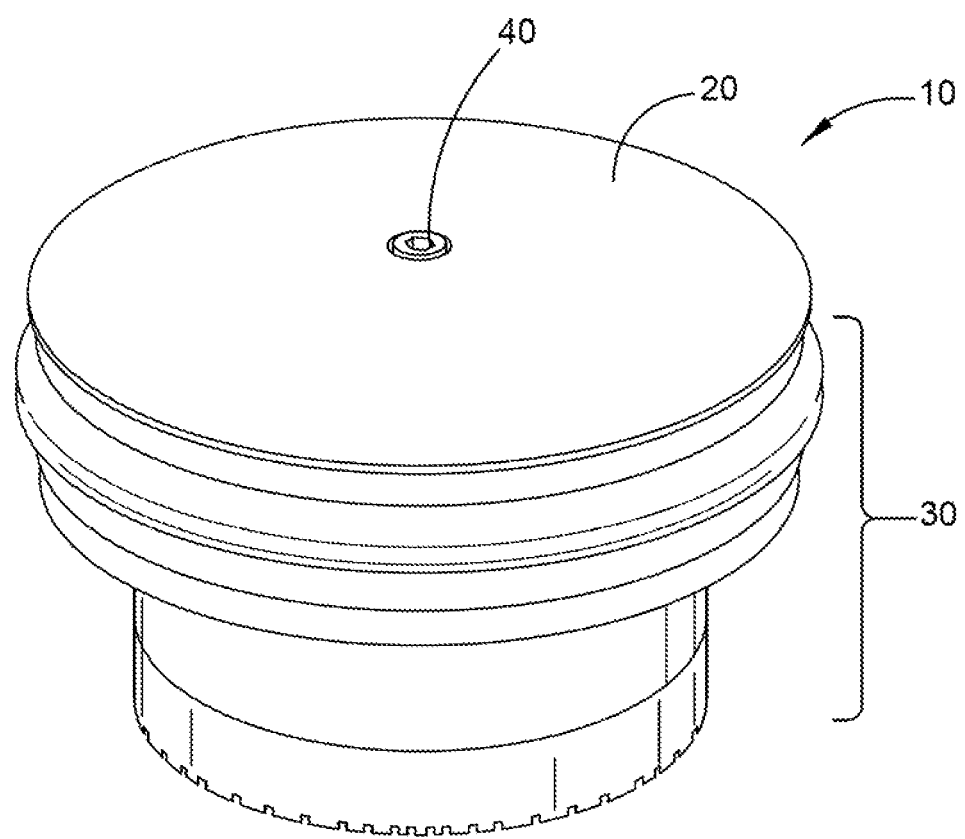
FIG. 1 is a perspective view of an exemplary valve.

The figures illustrate a valve 10 including a moveable element in the form of disc member 20 capping a tubular body 30. A shank 40 co-operates with each of the disc 20 and the body 30 to constrain the movement of the disc 20 relative to the body 30.

Figure 3:
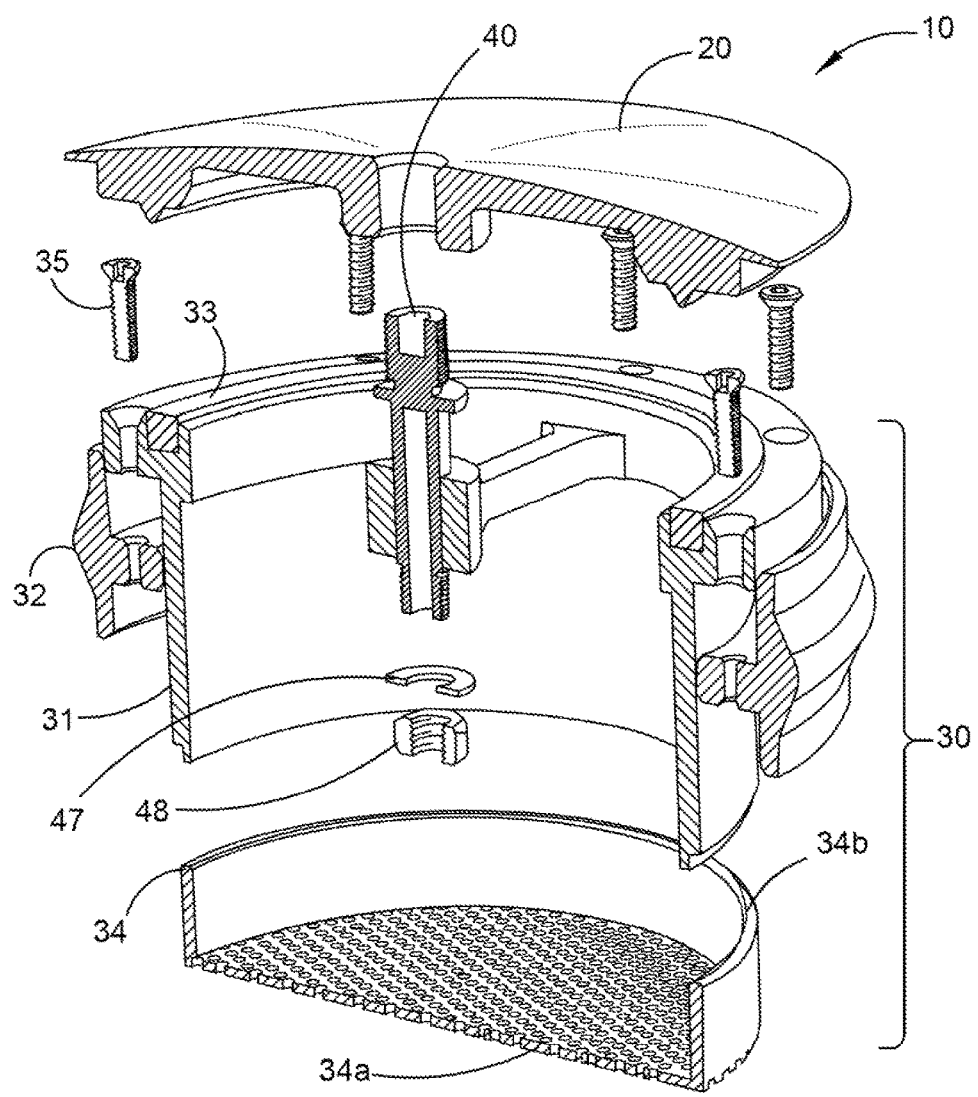
FIG. 3 is a cut away exploded view of the valve of FIG. 1.
Figure 4:
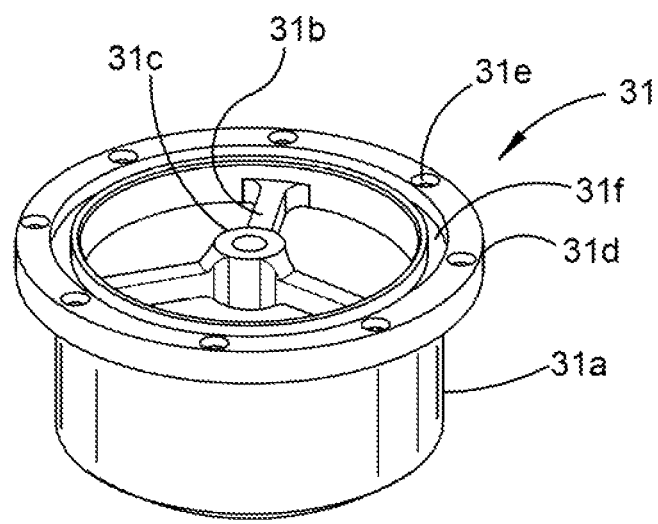
FIG. 4 is a perspective view of body insert of the valve of FIG. 1.
Figure 5A:
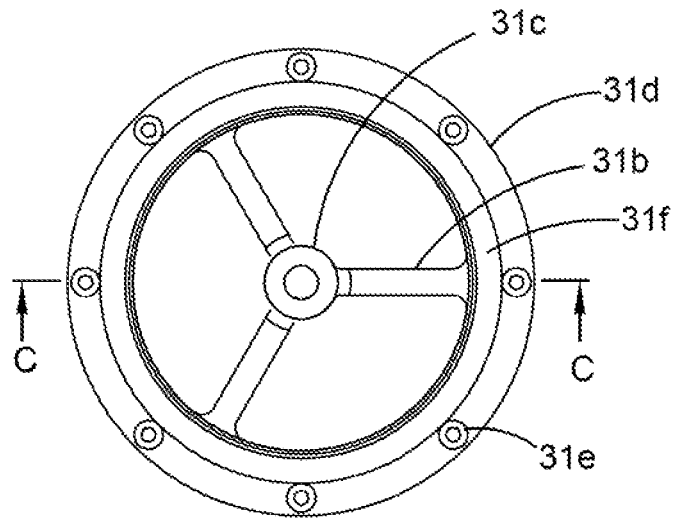
FIG. 5a is a top view of the body insert of FIG. 4.
Figure 5B:
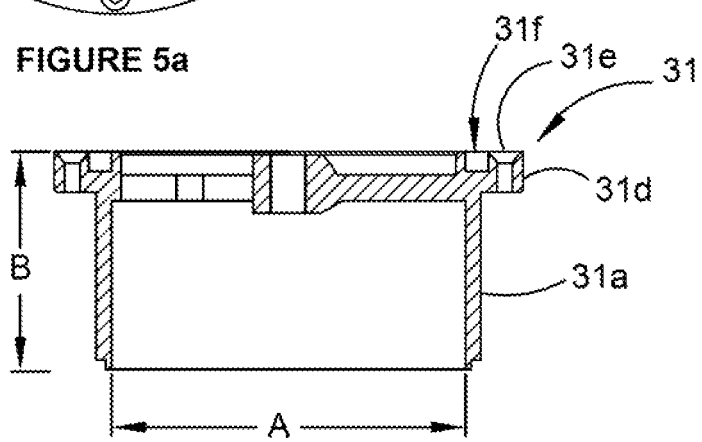
FIG. 5b is a vertical cross-section view of the body insert of FIG. 4.
Figure 6:
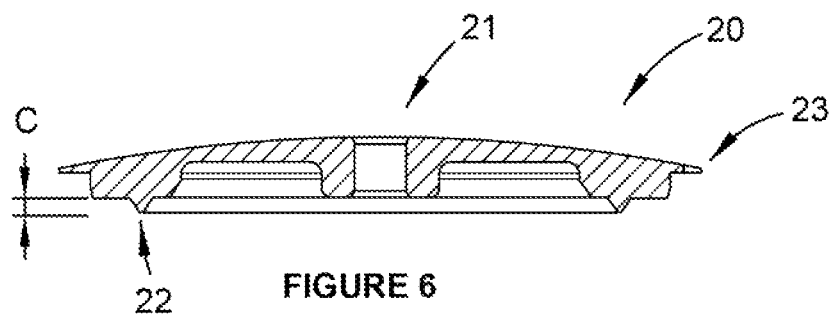
FIG. 6 is a vertical cross-section view of the disc of the valve of FIG. 1.
Figure 7:
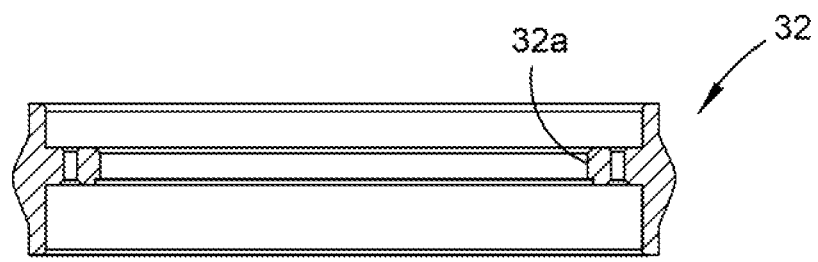
FIG. 7 is a vertical cross-section view of a collar of the valve of FIG. 1.
Figure 8:
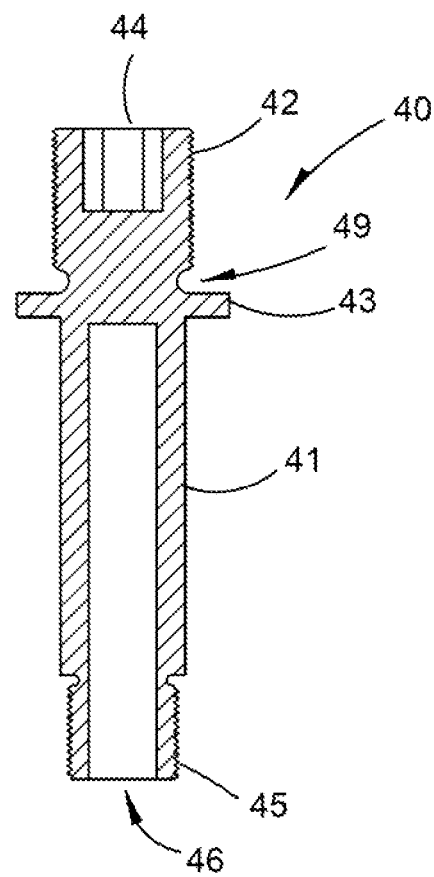
FIG. 8 is a vertical cross-section view of a shank of the valve of FIG. 1.

As best shown in FIG. 3, the body 30 includes a body insert 31 carried within a collar 32. The insert 31 carries a seal member 33 and is capped at its lower end by a filter member 34. A circular array of eight screws 35 fastens insert 31 to the collar 32. The insert 31 is an integrally molded body including an upright cylindrical tubular portion 31*a* having an internal diameter A (FIG. 5*b*) of about 153 mm corresponding to a cross-sectional area of about 18,400 m². The insert 31 is about 93 mm high (dimension B).

The upper end of the insert 31 is spanned by a trio of equi-spaced radial spokes 31*b* carrying a cylindrical tubular hub 31*c* concentric to the portion 31*a*. In the illustrated insert 31, each spoke 31*b* has a uniform rectangular transverse cross-section along its length, although it is also contemplated that the lower surface of each spoke will extend downwardly away from the central hub 31*c* at an oblique angle, so that each spoke 31*b* is triangular in elevation to better transmit vertical loads from the central hub 31*c* to the outer walls 31*a*. Increasing the thickness of the spoke in the direction of flow (vertical as drawn) increases the strength of the spoke, substantially without impeding flow as would be the case if the spoke were made wider.

The hub 31*c* has an internal diameter of about 15 mm, an external diameter of about 30 mm and is about 26 mm high. The hub 31*c* sits about 1 mm shy of the top of the insert 31.

An outwardly extending radial flange 31*d* encircles the upper end of the insert 31. The flange 31*d* is about 17 mm thick and has an external diameter of about 201 mm. Eight vertical counter sunk through-holes 31*e* open through the flange 31*d* to co-operate with the screws 35. The holes 31*e* are equi-spaced on a pitch circle having a diameter of about 185 mm and being concentric to the portion 31*a*.

The top of the insert 31 carries an upwardly-open circular channel 31*f*. The channel 31*f* runs concentric to the body 31*a* and has a rectangular transverse cross-section about 10 mm wide by about 8 mm deep. A centre line of the groove has a diameter of about 162 mm.

To accommodate the groove 31*f*, the top about 21 mm of the cylindrical interior of the insert 31 is stepped down to a diameter of about 145 mm. The spokes 31*b* are about 11 mm wide and sit within this 21 mm section whereby the cross-sectional area of the interior of the insert 31 is at this point about 14,000 mm².

The interior of the insert 31 is a flow path through which ground water flows upwardly to provide pressure relief.

The disc 20 is another integral body. It includes an internally-threaded through-bore 21 located concentrically to its circular outer periphery.

An annular ring 22 projects downwardly from the disc 20. The ring 22 runs concentrically to the outer periphery of the disc and has a V-shaped cross-section. The cross-section of the projection 22 is about 8 mm wide by about 8 mm high. The tip of the cross-section, i.e. the vertex of the V shape, sits at a diameter of about 162 mm in this example.

The upper surface of the disc 20 is domed and meets the disc's outer periphery 23 at a shallow angle. Testing has shown that the installed valve 10 does not cause any noticeable problems for suction cleaners, robot cleaners or manual vacuums. Likewise, testing has shown that suction cleaners, robot cleaners and manual vacuums do not cause any problem for the valve.

The collar 32 has an internal diameter of about 202 mm from which a radial flange 32*a* inwardly projects to a diameter of about 166 mm. The flange 32*a* carries a circular array of through-bores complementary to the array of through-bores 31*e*. In this example, the through-bores are threaded through-bores. The threads of the bores are preferably formed by the insertion of screw thread coils, such as those sold under the trade mark Heli-Coil®.

In other variants of the collar 32, the bores of the flange 32*a* are replaced by upwardly open blind bores to co-operate with self-tapping screws instead of bolts.

Optionally, the flange 32*a* carries more than one array of bores so that there is at least one spare array of bores to be used if and when the first array of bores is worn out. For example, when self-tapping screws are used, they may not find adequate purchase if returned to the original holes after the insert 31 has been removed, e.g. to service the valve. By way of example, the flange 32*a* might carry 16 equi-spaced bores making up two arrays of eight equi-spaced bores, the arrays being angularly offset from each other by half a pitch.

The shank 40 is another integrally formed piece. It includes an upright body 41. The body is cylindrical, having an external diameter of about 15 mm, excepting that four 1 mm deep machined flats (not shown) run along its vertical length and are equi-spaced about its periphery. The upper end of the shank 40 terminates in an externally-threaded portion 42 above an outwardly-projecting radial flange 43. An outwardly opening annular groove 49 separates the portion 42 from the flange 43.

A tool-engaging feature 44 is provided. In this example, the tool-engaging feature 44 is an Allen key receiving socket mounted concentrically within the top end of the shank 40. A lower end of the shank 40 terminates in an externally-threaded portion 45. The shank 40 is mostly hollow. A blind-bore 46 runs from the collar 43 and downwardly opens from the shank 40. This hollowing out reduces the weight of the shank 40.

The member 34 is an upwardly-open cup-like member including a planar floor 34*a* encircled by a short cylindrical wall 34*b* projecting upwards from the floor 34*a*.

The member 34 is configured to be fitted to the lower end of the insert 31. In particular the wall 34*b* is dimensioned to snugly fit over a portion at the lower end of the portion 31*a* which is stepped down to a reduced cylindrical diameter. As such the cylindrical interior of the member 34 has a larger cross-sectional area than the interior of the portion 31*a*.

The interior of the member 34 forms part of the flow path through which ground water flows upwardly through the body 30 and the floor 34*a* is a filter for filtering debris from that flow of water. In this example, the floor 34*a* is a web of material carrying a pattern of closely spaced circular apertures. Of course other forms of filters are possible, such as meshes and sponges, etc.

In the assembled valve 10, portion 42 of shank 40 threadingly engages bore 21, and the body 41 skewers the hub 31*c*. An O-ring (not shown) carried within the groove 49 sealingly engages a chamfered lower end of the bore 21. A washer 47 is fitted over the end 45 and a nut 48 in turn threadingly engaged with the end 45 whereby the hub 31*c* (and as a consequence the body insert 31) is captured on the shaft 41 of the shank 40.

The washer 47 is dimensioned to abut a downwardly-facing annular step at the lower end of the portion 41. The nut 48 is tightened on the portion 45 to clamp the washer 47 against that step, such that the washer 47 is fixed relative to the shank 40. The flats (or "flutes") of the portion 41 are one form of surface formation serving to significantly reduce the potential for build up that could, if left unchecked, jam the valve.

In operation, the disc 20 carries the shank 40 as it moves vertically, such that the collar 43 and the washer 47 alternately abut the hub 31c so as to constitute stops limiting the vertical movement of the disc 20 relative to the body 30. In particular, downward forces on the disc 20 are centrally transmitted rather than borne by the disc's thin periphery 23. The shank 40, washer 47 and nut 48 thus together constitute a constraint for constraining the movement of the disc 20.

In this example, the body 30 has a resilient portion in the form of a sealing ring 33 carried within the groove 31f. The ring 31 is dimensioned to fit snugly within this groove.

The V-profiled ring 22 sits in register above the sealing ring 33. The ring 22 of the disc 20 and the ring 33 of the body 30 co-operate to form a sealing arrangement encircling the cylindrical flow path of the body 30 such that the disc 20 blocks that flow path.

Figure 2:
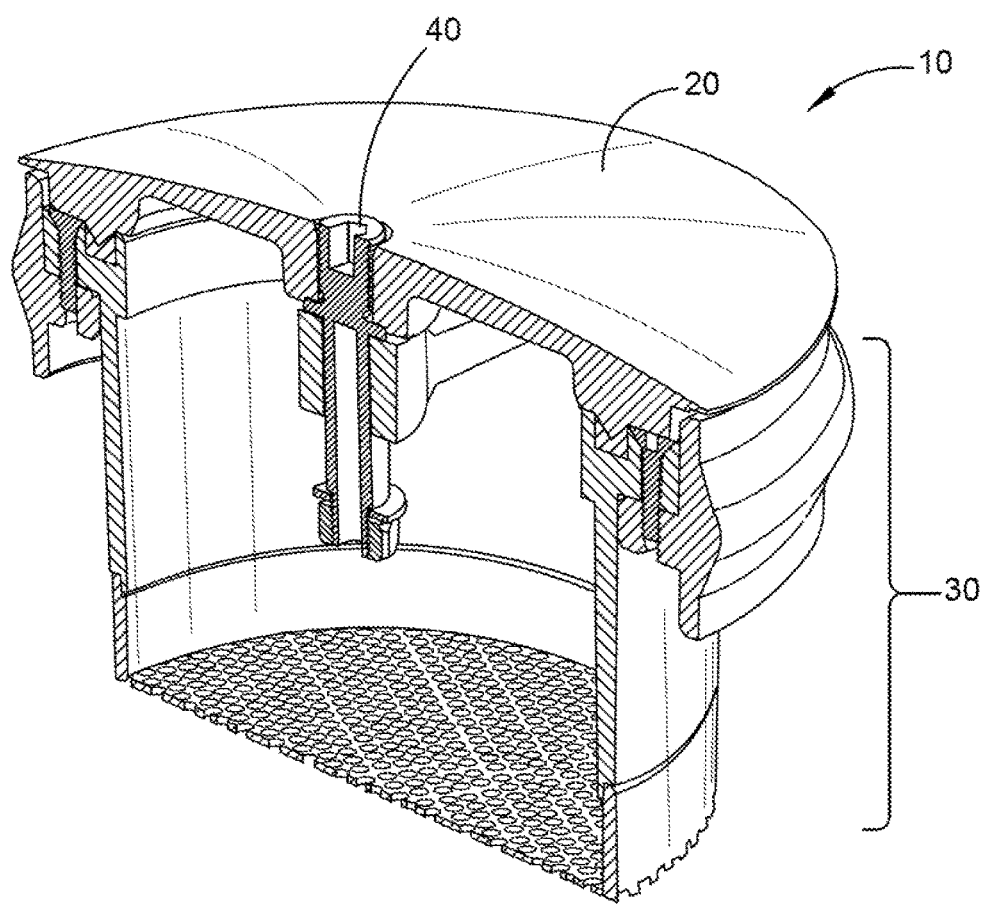
FIG. 2 is a cut away view of the valve of FIG. 1.

When the valve 10 is closed as in FIGS. 1 and 2, the annular vertex of the ring 22 presses about 3 mm into the seal 33 and the seal 33 conforms to the vertex to define an annular contact patch between the rings 22, 33 which is about 1 mm wide corresponding to an internal diameter of about 161 mm and an external diameter of about 163 mm.

Both ground water and pool water are effectively sealed out of this contact patch. These inner and outer diameters respectively correspond to the effective areas over which the ground water and the pool water act to vertically drive the disc 20 in opposite directions. In this example, the effective area over which the ground water acts to upwardly drive the disc 20 is about 20,400 mm² corresponding to $\frac{1}{4} \times \pi \times 161^2$. The effective area over which the pool water acts to downwardly drive the disc 20 is about 20,900 mm² corresponding to $\frac{1}{4} \times \pi \times 163^2$. Thus the ratio of these areas is over 0.97.

The inventors have recognised that this ratio is important, that a higher ratio is desirable, and that the ratio can be improved by enlarging the valve and/or reducing the width of the contact patch.

This critical ratio corresponds to the "sensitivity" of the valve—the ratio of the pool water pressure to ground water pressure at which the pressure forces on the disc 20 are in balance, such that any relative increase in ground water pressure will cause the valve to open.

The force exerted on the disc 20 for each of the pool water and the ground water can be calculated using the following formula by substituting the appropriate area and height of the supported water column.

$$F = A\rho g h$$

where:
A is the effective area in m²
$\rho$ is 1000 kg-m⁻³
g is 9.81 m-sec⁻²
h is the depth of the (pool or ground) water in m.

By applying this formula to the present valve when installed in the floor of a typical 1.5 m deep swimming pool, it can be calculated that the pool water exerts a downward force on the disc 20 of about 310N (equivalent to about 31 kg). It can also be calculated that when the ground water rises to a height of 1.53 m above the valve (i.e. 30 mm above the pool water) that the ground water exerts an upward force of about 310N, such that the pressure forces are in balance and any further increase in the ground water pressure will cause the valve to open to provide pressure relief.

Strictly speaking, the ground water pressure must rise sufficiently to also overcome the weight of the disc 20 and the shank 40. These weights are small relative to the above pressure forces and can be safely neglected for present purposes.

The above theory has been proven by practical study. Test results have shown that the valve 10 reliably opens when the ground water rises to about 30 mm above the pool water. In addition to the improved sensitivity, this sealing arrangement has been found to produce a more effective seal which is less affected by dirt and debris than various existing seals.

It is contemplated that the disc 20 be spring mounted (e.g. a helical compression spring may circle the shaft 41 and act between the hub 31c and the washer 47) to reduce leakage of the pool water when the ground water pressure is low, although experimentation suggests that this is not necessary.

The present inventors have recognised that some pool failures occur due to ill-informed pool attendants observing that the pool water level has risen (or perhaps even that the pool is overflowing) during or shortly after heavy rainfall, and in response thereto activating the pool pump to drive water out of the pool via the back wash line. A typical pool pump in its low, medium and high speed settings will deliver about 150, 300 and 450 liters per minute respectively in this mode of operation. Experimentation has shown that various existing pressure relief valves simply cannot cope with these flow rates.

The valve 10 is configured to achieve these flow rates and more. Indeed testing has shown that the valve 10 can provide effective pressure relief at up to 900 L/min. That said, smaller valves are contemplated for use in smaller pools in which the pump will typically be smaller and/or operated at less than its maximum output.

The design features to achieve these flow rates include the filter 34a spanning a large cross-section to minimise the fluid velocity and associated restriction to flow therethrough. Preferably the filter 34a has an open area not less than 50% of its total surface area. When the valve 10 is open, the disc 20 sits above the body 30 leaving a cylindrical gap between the vertex of the rib 22 and the ring 33 through which ground water flows radially outwards. The shank 40 and the hub 31c are co-operably dimensioned to allow for about 20 mm of vertical travel such that this cylindrical surface is about 17 mm high corresponding to a cross-sectional area of about 8,600 mm² (given by $\pi \times 162 \times 17$).

Sensitivity ratios of 0.9, 0.95 and 0.97 respectively correspond to activation (valve-open) pressures of 150 mm, 75 mm and 45 mm in a typical 1.5 m deep pool. 150 mm is considered the maximum that a fibreglass pool could reasonably be expected to withstand whereas 75 mm is considered to be a more practical figure. Valves having sensitivity ratios over 0.97 have been tested to relieve pressure at a pressure differential of about 30 mm, which pressure differential corresponds to the Australian Standard with which all Australian pools should comply.

Preferred forms of the valve 10 incorporate a mechanism for informing a pool attendant that the valve is opened. In one simple implementation this might be a light, or a portion of the valve having a colour contrasting to other portions of the valve and the pool floor, arranged to be concealed in the valve-closed position then revealed when the valve is opened. Other forms of the valve may include a sensor, such as an electrical sensor, for producing an output that may be interpreted by equipment external to the pool. Optionally this external equipment might produce an alarm (e.g. a siren and/or a warning light) and/or automatically intervene to stop or at least slow the emptying of the pool. By way of example, the external equipment might intervene by closing the back wash line and/or deactivating the pump. Various implementations of the sensor and the external equipment are possible. In particular both wired and wireless variants are contemplated.

It is also contemplated that the valve and/or the external equipment might include facility for data storage to prevent the pool being emptied when the valve has recently been opened. By way of example, the sensor might continue producing the output for a period of time after the valve has closed.

The illustrated valve 10 is intended for installation in a fibreglass swimming pool. The collar 32 is configured to be permanently fixed to the fibreglass body of the pool during manufacture of the fibreglass body. The other components can be installed later such that they are replaceable/serviceable items. Indeed it is contemplated that these other items be sold together as a kit. For the avoidance of doubt, this kit fits the description of "a valve" as the wording is used herein.

To assemble these other components, firstly insert 31 member 34, shank 40, washer 47 and nut 48 are together assembled. This assembly step might occur at the factory. This sub-assembly is then dropped into the installed collar 32 and rotated to move the holes 31e into registration with the hole of the flange 32a. Screws 35 are then inserted and with a suitable tool, in this case an Allen key, rotated to rigidly mount the sub-assembly to the collar. The screws 35 threadingly engage the holes of the flange 32a. Desirably the top inner edge of the flange 32a has a stepped profile (not shown) to accommodate an O-ring (not shown), which O-ring is axially compressed to sealingly engage the insert 31 when the screws 35 are tightened.

Next the disc 20 is sat atop the shank 40 and an Allen key inserted through the bore 21 to engage the socket 44. By rotating the Allen key, and in turn the shank 40, relative to the disc 40, the threading engagement of the disc 20 with the end portion 42 of the shank 40 is completed.

These assembly steps may easily be reversed, e.g. to replace a degraded seal 33 or clear a blocked filter 34a.

The shank 40a and the disc 20 together, including the threading engagement of those components and the tool-engaging feature 44, constitute a jacking arrangement for driving the disc 20 away from its closed, sealing, position. By rotating the shank 40, the disc 20 is driven upwards relative to shank 40, and the abutment of the flange 43 with the hub 31c prevents the shank 40 moving downwards.

This jacking arrangement aids in disassembly of the valve. Typically such disassembly would be performed by a diver in a water-filled pool. Unless this happens to be when the ground water pressure is high (i.e. when the valve is open or close to opening), then a significant pressure differential downwardly drives the disc 20, effectively clamping the valve closed. The jacking arrangement serves to drive the disc against this pressure differential.

Once the seal is broken, the pressure differential disappears and the disc 20 can be rotated about the shank 20 to be removed. By working quickly, a skilled diver can replace the sealing ring 33 while only an acceptable volume of water is lost from the pool. The lost water serves to backwash the filter 34a and so remove debris therefrom.

Of course other forms of jacking arrangement are possible.

The seal 33 is preferably formed of silicon sponge. This material is found to produce a better seal (i.e. a seal with less leaking) than natural rubber and to have a more durable shape less inclined to swell, shrink or otherwise disfigure than EPDM sponge.

The shank 40 acts as a constraint or guide to control the motion of the disc 20, such that the disc 20 remains in place to automatically return to its valve-closed position without intervention by a pool attendant. The valve 10 re-seals automatically when the ground water drops to about 30 mm below the pool water.

The invention claimed is:

1. A valve, for relieving ground water pressure on a swimming pool for containing pool water, including
    a body defining a flow path; and
    an element mounted to be moved in a direction, from a position in which at least one feature of the element co-operates with at least one feature of the body to form a sealing arrangement to block the flow path to retain the pool water, to a position in which the flow path is open to allow ground water into the swimming pool;
    the sealing arrangement defining an effective area over which the ground water pressure acts on the valve to drive the element in the direction; and an effective area over which pool water pressure acts on the valve to drive the element opposite the direction;
    wherein the effective area over which the ground water pressure acts on the valve to the effective area over which the pool water pressure acts on the valve is a ratio having a value of at least 0.9.

2. The valve of claim 1 wherein the co-operable features are configured such that the ratio has a value of at least 0.95.

3. The valve of claim 1 wherein the co-operable features are configured such that the ratio has a value of more than 0.97.

4. The valve of claim 1 wherein the co-operable features include
    a resilient portion of one of the element and the body; and
    a projection of the other of the element and the body;
    the resilient portion and the projection each encircle the flow path; and
    in transverse cross-section the projection defines a tip for pressing into the resilient portion.

5. The valve of claim 4 wherein in transverse cross-section the projection is in substance V-shaped at least at the tip.

6. The valve of claim 4 wherein the resilient portion is a ring carried in an annular groove.

7. The valve of claim 4 wherein the resilient portion is a resilient portion of the body.

8. The valve of claim 1 including a constraint by which the element is constrained, relative to the body, so as to automatically move, when pressure relief is no longer required, from its position in which the flow path is open to its position in which the flow path is blocked.

9. The valve of claim 1 wherein the valve is configured to when open allow ground water into the pool via the flow path at least at a rate over at least some of a range of ground water pressures up to and including a pressure differential above the pool water pressure;
    the rate is at least 150 L/min; and
    the pressure differential is at most 150 mm (water).

10. A valve, for relieving ground water pressure on a swimming pool for containing pool water, including
    a body defining a flow path;
    an element mounted to be moved in a direction, from a position in which the element blocks the flow path to retain the pool water, to a position in which the flow path is open to allow ground water into the swimming pool at least at a rate over at least some of a range of ground water pressures up to and including a pressure differential above the pool water pressure; and a constraint by which the element is constrained, relative to the body, so as to automatically move, when pressure relief is no longer required, from its position in which the flow path is open to its position in which the flow path is blocked;

wherein the rate is at least 150 L/min; and the pressure differential is at most 150 mm (water).

11. The valve of claim 10 wherein the rate is 300 L/min.

12. The valve of claim 10 wherein the rate is 450 L/min.

13. The valve of claim 10 wherein the pressure differential is 75 mm (water).

14. The valve of claim 10 wherein the pressure differential is 30 mm (water).

15. A valve, for relieving ground water pressure on a swimming pool for containing pool water, including a body defining a flow path;

an element mounted to be moved by the ground water pressure in a direction, from a position in which the element blocks the flow path to retain the pool water, to a position in which the flow path is open to allow ground water into the swimming pool; and a constraint by which the element is constrained, relative to the body, so as to automatically move, when pressure relief is no longer required, from its position in which the flow path is open to its position in which the flow path is blocked;

wherein the constraint includes a threaded piece; and a top end of the threaded piece includes a tool engaging feature accessible from within the pool when the valve is closed and by which the threaded piece is rotatable relative to the element.

16. The valve of claim 15 wherein the threaded piece is rotatable to drive the element away from the position in which the element blocks the flow path.

17. The valve of claim 15 including a jacking arrangement for driving the element away from the position in which the element blocks the flow path.

18. A valve, for relieving ground water pressure on a swimming pool for containing pool water, including a body defining a flow path;

an element mounted to be moved by the ground water pressure in a direction, from a position in which the element blocks the flow path to retain the pool water, to a position in which the flow path is open to allow ground water into the swimming pool; and a jacking arrangement for driving the element away from the position in which the element blocks the flow path and to assist a diver in a water-filled in-ground pool to break a seal of the valve.

19. The valve of claim 18 wherein the jacking arrangement includes a threaded piece rotatable relative to the element to so drive the element.

20. The valve of claim 19 wherein the threaded piece is threadingly engaged with the element.

21. A swimming pool including the valve of claim 1.

22. A swimming pool including the valve of claim 10.

23. A swimming pool including the valve of claim 15.

24. A swimming pool including the valve of claim 18.

* * * * *